US012700640B2

(12) United States Patent
Choi et al.

(10) Patent No.: US 12,700,640 B2
(45) Date of Patent: Aug. 4, 2026

(54) BATTERY MODULE, AND BATTERY PACK AND VEHICLE COMPRISING SAME

(71) Applicant: LG ENERGY SOLUTION, LTD., Seoul (KR)

(72) Inventors: Bum Choi, Daejeon (KR); Jong-Yoon Keum, Daejeon (KR); Gae-Sung Kim, Daejeon (KR); Dong-Hwan Shin, Daejeon (KR); Soo-Jun Ahn, Daejeon (KR); Seung-Min Lee, Daejeon (KR); Jong-Chul Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 728 days.

(21) Appl. No.: 17/927,298

(22) PCT Filed: Feb. 9, 2022

(86) PCT No.: PCT/KR2022/002005
§ 371 (c)(1),
(2) Date: Nov. 22, 2022

(87) PCT Pub. No.: WO2022/173231
PCT Pub. Date: Aug. 18, 2022

(65) Prior Publication Data
US 2023/0207958 A1      Jun. 29, 2023

(30) Foreign Application Priority Data
Feb. 9, 2021     (KR) ........................ 10-2021-0018520

(51) Int. Cl.
H01M 50/367       (2021.01)
H01M 10/613       (2014.01)
(Continued)

(52) U.S. Cl.
CPC ....... *H01M 50/367* (2021.01); *H01M 10/613* (2015.04); *H01M 10/653* (2015.04);
(Continued)

(58) Field of Classification Search
CPC ............. H01M 50/367; H01M 10/613; H01M 10/653; H01M 50/213; H01M 50/293;
(Continued)

(56) References Cited

U.S. PATENT DOCUMENTS

2006/0071637 A1     4/2006  Heo et al.
2010/0255359 A1    10/2010  Hirakawa et al.
(Continued)

FOREIGN PATENT DOCUMENTS

CN         107546441 A      1/2018
CN         108075074 A  *   5/2018    .......... H01M 10/613
(Continued)

OTHER PUBLICATIONS

International Search Report for PCT/KR2022/002005 (PCT/ISA/210) mailed on May 3, 2022.
(Continued)

*Primary Examiner* — Kaity V Chandler
(74) *Attorney, Agent, or Firm* — Birch, Stewart, Kolasch & Birch, LLP

(57) ABSTRACT

Discussed is a battery cell assembly that may include a plurality of battery cells, a bus bar assembly on the battery cell assembly and electrically connected to the plurality of battery cells, a cooling unit spaced apart by a certain distance from the bus bar assembly and configured to cool the battery cell assembly, and a potting resin on at least one of an upper side and a lower side of the battery cell assembly.

20 Claims, 7 Drawing Sheets

(51) Int. Cl.
    *H01M 10/653*    (2014.01)
    *H01M 50/213*    (2021.01)
    *H01M 50/293*    (2021.01)
    *H01M 50/383*    (2021.01)
    *H01M 50/507*    (2021.01)
(52) U.S. Cl.
    CPC ....... *H01M 50/213* (2021.01); *H01M 50/293*
    (2021.01); *H01M 50/383* (2021.01); *H01M*
    *50/507* (2021.01)
(58) Field of Classification Search
    CPC ............. H01M 50/383; H01M 50/507; H01M
    2220/20; H01M 10/647; H01M 10/6556;
    H01M 10/625; H01M 10/6553; H01M
    10/643; H01M 10/6554; H01M 10/659;
    H01M 50/227; H01M 50/249; H01M
    50/30; H01M 50/24; H01M 50/3425;
    H01M 50/502; H01M 2200/20; Y02E
    60/10
    See application file for complete search history.

(56) References Cited

U.S. PATENT DOCUMENTS

| | | |
|---|---|---|
| 2012/0003513 A1 | 1/2012 | Fuhr |
| 2013/0209843 A1 | 8/2013 | Ito et al. |
| 2013/0280559 A1 | 10/2013 | Guidal et al. |
| 2016/0172727 A1 | 6/2016 | Chan et al. |
| 2016/0248061 A1 | 8/2016 | Brambrink et al. |
| 2018/0198154 A1 | 7/2018 | Lee et al. |
| 2018/0316071 A1 | 11/2018 | Newman et al. |
| 2019/0214694 A1 | 7/2019 | Yang et al. |
| 2019/0229384 A1 | 7/2019 | Tasiopoulos et al. |
| 2019/0245169 A1 | 8/2019 | Kim et al. |
| 2020/0153057 A1 | 5/2020 | Wynn et al. |
| 2020/0220147 A1 | 7/2020 | Haino et al. |
| 2021/0057689 A1 | 2/2021 | Park et al. |
| 2021/0391628 A1 | 12/2021 | Hattendorff et al. |

FOREIGN PATENT DOCUMENTS

| | | | | |
|---|---|---|---|---|
| CN | 108305966 A | * | 7/2018 | ........ H01M 10/6556 |
| CN | 209232840 U | * | 8/2019 | ............. Y02E 60/10 |
| CN | 111164786 A | | 5/2020 | |
| CN | 111670516 A | | 9/2020 | |
| CN | 111819714 A | * | 10/2020 | ......... H01M 50/107 |
| CN | 212182431 U | | 12/2020 | |
| CN | 112673518 A | * | 4/2021 | ......... H01M 10/625 |
| JP | 9-237617 A | | 9/1997 | |
| JP | 2006-93132 A | | 4/2006 | |
| JP | 2007-27011 A | | 2/2007 | |
| JP | 4102184 B2 | * | 6/2008 | ......... H01M 50/184 |
| JP | 2008153111 A | * | 7/2008 | ............ Y02E 60/10 |
| JP | 2008-251471 A | | 10/2008 | |
| JP | 2009-135088 A | | 6/2009 | |
| JP | 2012015121 A | * | 1/2012 | ......... H01M 50/367 |
| JP | 2012-248284 A | | 12/2012 | |
| JP | 5341156 B2 | * | 11/2013 | ......... H01M 50/367 |
| JP | 2014-49427 A | | 3/2014 | |
| JP | 2017-536658 A | | 12/2017 | |
| JP | 2018-190607 A | | 11/2018 | |
| JP | 2019-129149 A | | 8/2019 | |
| KR | 10-2013-0093540 A | | 8/2013 | |
| KR | 10-1292534 B1 | | 8/2013 | |
| KR | 10-2018-0083566 A | | 7/2018 | |
| KR | 10-1965373 B1 | | 4/2019 | |
| KR | 10-2019-0083533 A | | 7/2019 | |
| KR | 10-2019-0089907 A | | 7/2019 | |
| KR | 10-2019-0134229 A | | 12/2019 | |
| KR | 10-2020-0068479 A | | 6/2020 | |
| WO | WO 2012/141191 A1 | | 10/2012 | |
| WO | WO 2018/094187 A1 | | 5/2018 | |
| WO | WO 2019/021980 A1 | | 1/2019 | |
| WO | WO2020/053251 A1 | | 3/2020 | |
| WO | WO-2020094364 A1 | * | 5/2020 | ........ H01M 10/6557 |

OTHER PUBLICATIONS

Extended European Search Report for European Application No. 22752991.4, dated Oct. 11, 2024.
European Communication pursuant to Article 94(3) EPC for European Application No. 22752991.4, dated Jul. 2, 2025.
European Communication pursuant to Article 94(3) EPC for European Application No. 22 752 991.4, dated Mar. 3, 2026.

* cited by examiner

BATTERY MODULE, AND BATTERY PACK AND VEHICLE COMPRISING SAME

TECHNICAL FIELD

The present disclosure relates to a battery module, and a battery pack and a vehicle including the same.

The present application claims priority to Korean Patent Application No. 10-2021-0018520 filed on Feb. 9, 2021 in the Republic of Korea, the disclosures of which are incorporated herein by reference.

BACKGROUND ART

Secondary batteries have high applicability according to product groups and electrical characteristics such as high energy density, and thus, are commonly applied not only to mobile devices but also to electric vehicles (EVs) or hybrid vehicles (HEVs) driven by electric power sources. Because secondary batteries may radically reduce the use of fossil fuel and do not generate any by-products that come with energy consumption, the secondary batteries are gaining attention as a new alternative energy source for improving eco-friendliness and energy efficiency.

Types of secondary batteries that are currently widely used include lithium-ion batteries, lithium polymer batteries, nickel cadmium batteries, nickel hydride batteries, and nickel zinc batteries. An operating voltage of a unit secondary battery cell, that is, a unit battery cell, ranges from about 2.5 V to about 4.5 V. Accordingly, when a higher output voltage is required, a battery pack may be configured by connecting a plurality of battery cells in series. Also, a battery pack may be configured by connecting a plurality of battery cells in parallel according to charge/discharge capacity required for the battery pack. Accordingly, the number of battery cells included in a battery pack may be set in various ways according to a required output voltage or charge/discharge capacity.

When a battery pack is configured by connecting a plurality of battery cells in series/parallel, a method of first configuring a battery module including at least one battery cell and adding other elements by using the at least one battery module to configure a battery pack or a battery rack is general.

Because a battery module or a battery pack in the related art includes a plurality of battery cells, it is important to improve the cooling performance of the battery cells and ensure safety when a dangerous situation occurs due to overheating or the like. To ensure safety, it is particularly important to more quickly and reliably prevent flame or heat transfer to surrounding battery cells when a fire occurs due to overheating or the like of a specific battery cell among the plurality of battery cells.

Hence, there is a demand to provide a battery module in which cooling performance is improved and safety is ensured, and a battery pack and a vehicle including the battery module.

DISCLOSURE

Technical Problem

The present disclosure is designed to solve the problems of the related art, and therefore the present disclosure is directed to providing a battery module in which cooling performance is improved, and a battery pack and a vehicle including the battery module.

The present disclosure is also directed to providing a battery module in which safety is ensured when an abnormal situation occurs due to overheating or the like of a battery cell, and a battery pack and a vehicle including the battery module.

Technical Solution

In an aspect of the present disclosure, there is provided a battery module including a battery cell assembly including a plurality of battery cells, a bus bar assembly on the battery cell assembly and electrically connected to the plurality of battery cells, a cooling unit spaced apart by a certain distance from the bus bar assembly and configured to cool the battery cell assembly, and a potting resin on at least one of an upper side and a lower side of the battery cell assembly.

The bus bar assembly may be on the upper side of the battery cell assembly, and wherein the potting resin may be filled to cover the bus bar assembly.

The cooling unit may be on the lower side of the battery cell assembly.

The cooling unit may have a certain length in a stack direction of the battery cell assembly, and may be between the upper side and the lower side of the battery cell assembly.

A vent unit, may be under the plurality of battery cells, the vent unit may be configured to discharge gas therethrough, and the potting resin may be filled to cover the vent unit under the plurality of battery cells.

The potting resin may include a thermally conductive material.

The potting resin may include a phase-change material.

The potting resin may include a paraffin material.

The potting resin may include a flame retardant.

In another aspect of the present disclosure, there is also provided a battery pack including: at least one of the battery module according to the above embodiments; and a pack case for packaging the at least one of the battery module.

In another aspect of the present disclosure, there is also provided a vehicle including at least one of the battery pack according to the above embodiment.

Advantageous Effects

According to the various embodiments, a battery module in which cooling performance is improved, and a battery pack and a vehicle including the battery module may be provided.

In addition, according to the various embodiments, a battery module in which safety is ensured when an abnormal situation occurs due to overheating or the like of a battery cell, and a battery pack and a vehicle including the battery module may be provided.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will now be described more fully with reference to the accompanying drawings, in which exemplary embodiments of the present disclosure are shown. These embodiments are provided so that the present disclosure will be thorough and complete, and will fully convey the concept of the present disclosure to one of ordinary skill in the art, and the present disclosure may be embodied in many different forms and should not be construed as being limited to the embodiments set forth herein. In addition, in order to help the understanding of the present disclosure, the accompanying drawings are not drawn to scale, but dimensions of some components may be exaggerated.

Figure 1:
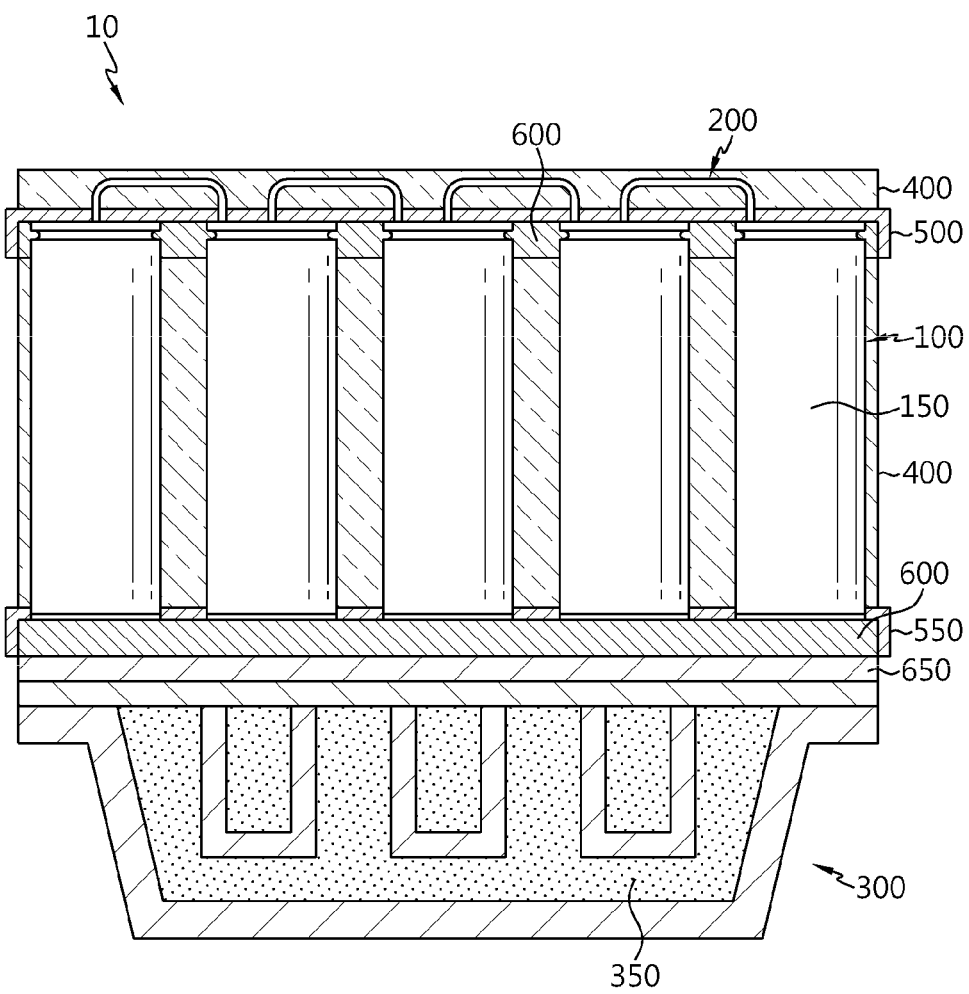
FIG. 1 is a view for describing a battery module according to an embodiment of the FIG. 2 is a view for describing a battery module according to another embodiment of the present disclosure.

FIG. 1 is a view for describing a battery module according to an embodiment of the present disclosure.

Referring to FIG. 1, a battery module 10 may include a battery cell assembly 100, a bus bar assembly 200, a cooling unit 300, and a potting resin 400.

The battery cell assembly 100 may include a plurality of battery cells 150.

The plurality of battery cells 150 that are secondary batteries may be cylindrical secondary batteries, pouch-type secondary batteries, or prismatic secondary batteries. Hereinafter, the present embodiment will be described assuming that the plurality of battery cells 150 are cylindrical secondary batteries.

The bus bar assembly 200 may be provided on a side of the battery cell assembly 100, and may be electrically connected to the plurality of battery cells 150. In detail, the bus bar assembly 200 may be provided on an upper side of the battery cell assembly 100, and may be electrically connected to the battery cells 150 through wire bonding or laser welding.

The cooling unit 300 for cooling the battery cell assembly 100 may be spaced apart by a certain distance from the bus bar assembly 200. In detail, the cooling unit 300 may be located on a lower side of the battery cell assembly 100, and may include a cooling passage 350 through which cooling water or the like flows. That is, the cooling unit 300 may have a bottom cooling structure.

The potting resin 400 that is a thermally conductive material may be filled on at least one of the upper side and the lower side of the battery cell assembly 100 to improve the cooling performance of the battery cell assembly 100 and more firmly support the battery cell assembly 100.

The potting resin 400 may be located on the upper side of the battery cell assembly 100 and may be filled to cover the bus bar assembly 200. Because the potting resin 400 covers an area around the bus bar assembly 200 having a relatively high temperature distribution in the battery module 10, the cooling performance of the battery cells 150 may be effectively improved.

The potting resin 400 may be filled between the battery cells 150 of the battery cell assembly 100. In detail, the potting resin 400 may be located on the upper side of the battery cell assembly 100 to cover the bus bar assembly 200 and may be filled between the battery cells 150. The potting resin 400 may be continuously filled without interruption in a vertical direction of the battery module 10.

The potting resin 400 may include a silicone resin or a urethane resin having high cooling and adhesion performance. This is merely an example, and the potting resin 400 may include another resin material such as an acrylic resin or an epoxy resin having high cooling and adhesion performance.

The potting resin 400 may include a phase-change material. This is to further improve the cooling performance of the potting resin 400, and to further reduce thermal energy of the battery cells 150 through phase change. For example, the potting resin 400 may include a paraffin material. Because the paraffin material may undergo phase change at a temperature of 33° C. to 46° C. to absorb heat, the cooling performance of the battery cells 150 may be effectively improved. The paraffin material may be encapsulated by an acrylic coating or the like to further improve the injection performance when the potting resin 400 is injected.

The potting resin 400 may include a flame retardant. The flame retardant that is a ceramic-based flame retardant may be added to the potting resin 400. For example, the flame retardant may be aluminum hydroxide.

Accordingly, because the potting resin 400 is provided as a composite resin including a resin material such as a silicone resin or a urethane resin, a paraffin material that is a phase-change material, and a flame retardant such as aluminum hydroxide, the cooling performance of the battery cells 150 may be significantly improved and heat transfer to the surroundings when an abnormal situation of the battery cells 150 occurs may be more effectively prevented.

The battery module 10 may further include top frame 500, a bottom frame 550, an adhesive member 600, and an insulating member 650.

The top frame 500 may be located on the upper side of the battery cell assembly 100, and may support an upper end portion of the battery cell assembly 100. The top frame 500 may include at least one opening to guide injection of the potting resin 400 and electrical connection between the battery cells 150 and the bus bar assembly 200.

The bottom frame 550 may be located on the lower side of the battery cell assembly 100, and may support a lower end portion of the battery cell assembly 100. A lower end portion of each of the battery cells 150 of the battery cell assembly 100 may be inserted into the bottom frame 550.

The bottom frame 550 may be an injection frame. The bottom frame 550 may be formed of a metal material for improving cooling effect. For example, the bottom frame 550 may be formed of an aluminum material.

The adhesive member 600 may be provided on the bottom frame 550 and the top frame 500, and may further firmly fix the battery cells 150 of the battery cell assembly 100 to the bottom frame 550 and the top frame 500.

The adhesive member 600 may be a thermally conductive adhesive to improve the cooling performance of the battery cells 150, and may include a composite resin such as the potting resin 400.

The insulating member 650 for insulating the battery cells 150 of the battery cell assembly 100 may be located between the cooling unit 300 and the adhesive member 600. As such, through the potting resin 400 including a phase-change material and a flame retardant, the battery module 10 according to the present embodiment may guide uniform heat dispersion of the battery cells 150 of the battery cell assembly 100, thereby significantly improving the cooling performance of the battery cells 150.

Also, through the potting resin 400 including the flame retardant, when overheating or a fire occurs due to an abnormal situation of at least one of the battery cells 150, the battery cell 10 according to the present embodiment may prevent direct flame transfer to adjacent battery cells 150, thereby effectively preventing chain firing.

That is, when an abnormal situation such as overheating or the like of the battery cells 150 occurs, the potting resin 400 may prevent explosion or the like due to thermal runaway caused by chain firing or the like, thereby ensuring the safety of the battery module 10.

In addition, because the potting resin 400 is filled between the battery cells 150 of the battery cell assembly 100, the battery module 10 according to the present embodiment may reinforce the rigidity of the battery cell assembly 100 and a module case of the battery module 10 may be formed through the potting resin 400 without an additional member such as a separate side frame.

Accordingly, through the potting resin 400, the battery module 10 according to the present embodiment may improve the manufacturing process efficiency of the battery module 10 and may significantly reduce manufacturing costs in terms of cost competitiveness.

Figure 2:
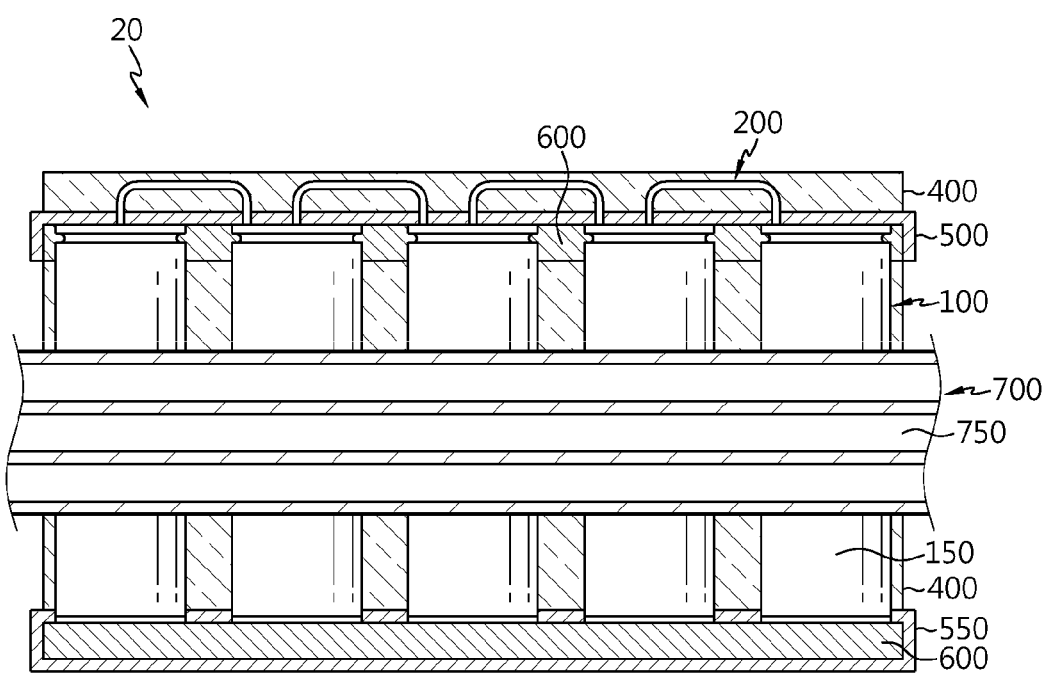

FIG. 2 is a view for describing a battery module according to another embodiment of the present disclosure.

Because a battery module 20 according to the present embodiment is similar to the battery module 10 according to the above embodiment, a repeated description of elements that are substantially the same as or similar to those in the above embodiment will be omitted and the following will focus on a difference from the above embodiment.

Referring to FIG. 2, the battery module 20 may include the battery cell assembly 100 including the plurality of battery cells 150, the bus bar assembly 200, the potting resin 400, the top frame 500, the bottom frame 550, the adhesive member 600, and a cooling unit 700.

The battery cell assembly 100, the bus bar assembly 200, the potting resin 400, the top frame 500, the bottom frame 550, and the adhesive member 600 are substantially the same as or similar to those in the above embodiment, and thus, a repeated description thereof will be omitted.

The cooling unit 700 may have a certain length in a stack direction of the battery cell assembly 100, and may be located between an upper side and a lower side of the battery cell assembly 100. The cooling unit 700 may have a certain length in the stack direction, and may include at least one cooling passage 750 through which a coolant such as cooling water flows. That is, the cooling unit 700 may have a side cooling structure.

As such, the potting resin 400 according to the present embodiment may also be applied to a cooling method of the side cooling structure. That is, through the potting resin 400, the battery module 20 having the side cooling structure according to the present embodiment may improve cooling performance, ensure safety such as prevention of chain firing, improve manufacturing efficiency, and reduce manufacturing costs as in the above embodiment.

Figure 3:
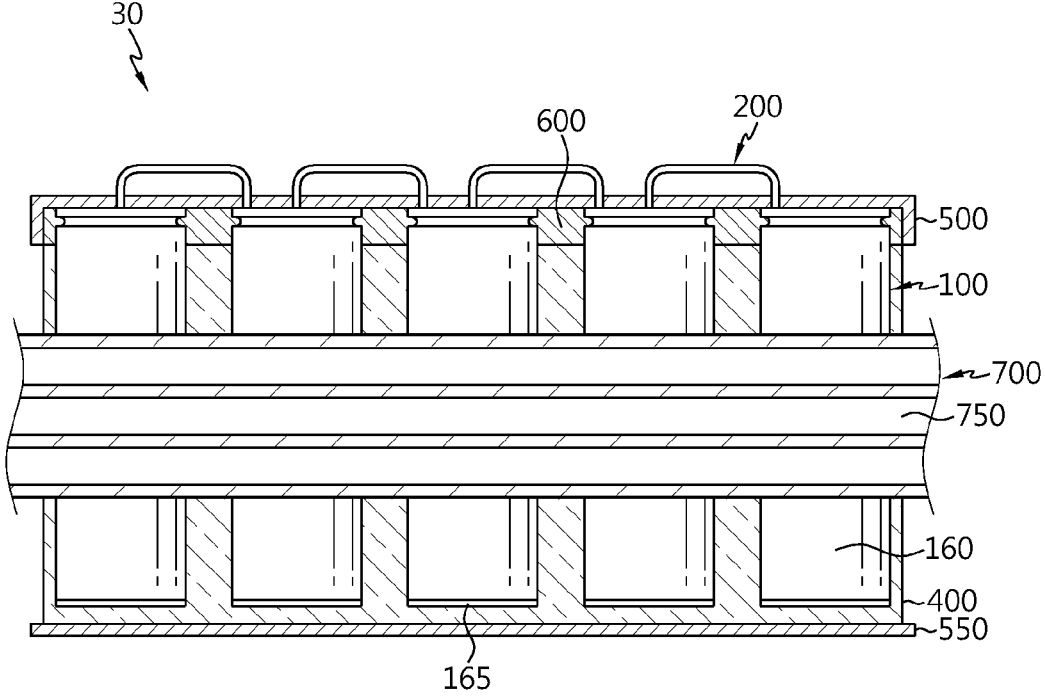
FIGS. 3 and 4 are views for describing a battery module according to another embodiment of the present disclosure.
Figure 4:
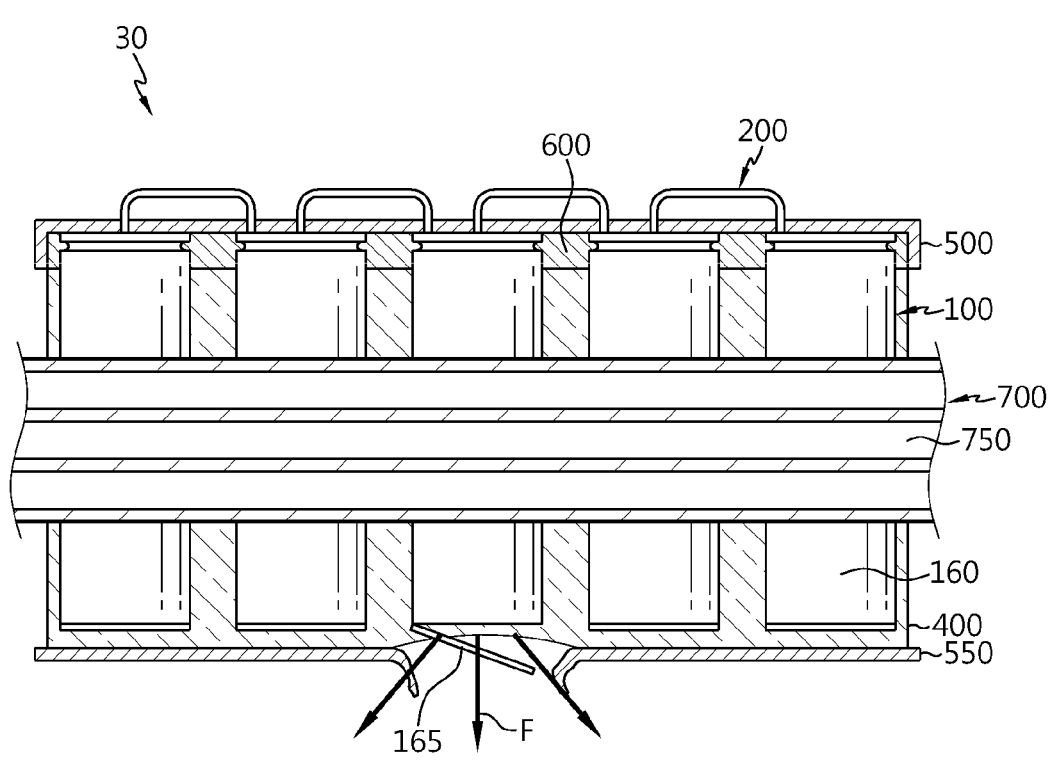

FIGS. 3 and 4 are views for describing a battery module according to another embodiment of the present disclosure.

A battery module 30 according to the present embodiment is similar to the battery modules 10, 20 according to the above embodiments, and thus, a repeated description of elements that are substantially the same as or similar to those in the above embodiments will be omitted and the following will focus on a difference from the above embodiments.

Referring to FIGS. 3 and 4, the battery module 30 may include the battery cell assembly 100, the bus bar assembly 200, the potting resin 400, the top frame 500, the bottom frame 550, the adhesive member 600, and the cooling unit 700.

The battery cell assembly 100 may include a plurality of battery cells 160.

A vent unit 165 through which gas or flame F is discharged may be provided under the plurality of battery cells 160. The vent unit 165 may be formed at a lower end portion of the battery cell 160 to have a thickness less than that of a peripheral portion. When an abnormal situation occurs in the battery cell 160 and an internal pressure increases to a certain pressure or more, the vent unit 165 may break to more easily discharge the gas or flame F to the outside of the battery cell 160.

The vent unit 165 may be provided as an opening or a notch having a certain size. In addition, the vent unit 165 may be formed by further adding a film or the like that breaks at a certain pressure or more to the opening having the certain size.

The vent unit may be provided on an upper end portion, instead of the lower end portion of the battery cell 160, that is, on an upper side of the battery cell 160. In other words, the vent unit may break at the upper side of the battery cell 160 to discharge the gas or flame F to the outside of the upper side of the battery cell 160. That is, the vent unit may break to discharge the gas or flame F from at least one of the lower side and the upper side of the battery cell 160 or both sides of the battery cell 160.

The bus bar assembly 200 is substantially the same as or similar to that in the above embodiments, and thus, a repeated description thereof will be omitted.

The potting resin 400 may be filled between the battery cells 160. In addition, the potting resin 400 may be located under the battery cells 160 and may be filled to cover the vent unit 165.

The top frame 500, the bottom frame 550, the adhesive member 600, and the cooling unit 700 are substantially the same as or similar to those in the above embodiments, and thus a repeated description thereof will be omitted.

In the present embodiment, because the vent unit 165 is located in a lower portion of the battery module 30, when overheating or fire due to an abnormal situation occurs in the battery cell 160, the internal gas or flame F may be discharged to a lower side of the battery module 30 rather than an upper side of the battery module 30. For example, when the battery module 30 is provided in a vehicle or the like, because an occupant such as a driver is generally located on the upper side of the battery module 30, when the gas or flame F is guided to the lower side of the battery module 30, the safety of the occupant such as the driver may be ensured as much as possible.

Also, in the present embodiment, when overheating or fire due to an abnormal situation of the battery cell 160 occurs, because the internal gas or flame F is guided toward the lower side of the battery module 30 through the vent unit 165, the risk of chain firing through transfer of the gas or flame F to the battery cells 160 adjacent to the battery cell 160 in which the abnormal situation occurs may be significantly prevented.

In addition, in the present embodiment, because the potting resin 400 is filled under the vent unit 165 of the battery cells 160, propagation of the flame F to the battery cells 160 adjacent to the battery cell 160 in which the abnormal situation occurs and the vent unit 165 is opened may be effectively prevented through the potting resin 400.

In the present embodiment, when the flame F or the like is generated, in order to cause the flame F or the like to be discharged more quickly to the outside of the battery module 30 before propagating to the battery cells 160 adjacent to the battery cell 160 in which the abnormal situation occurs, the bottom frame 550 may be formed of a material that is easily broken by the flame F or the like.

Figure 5:
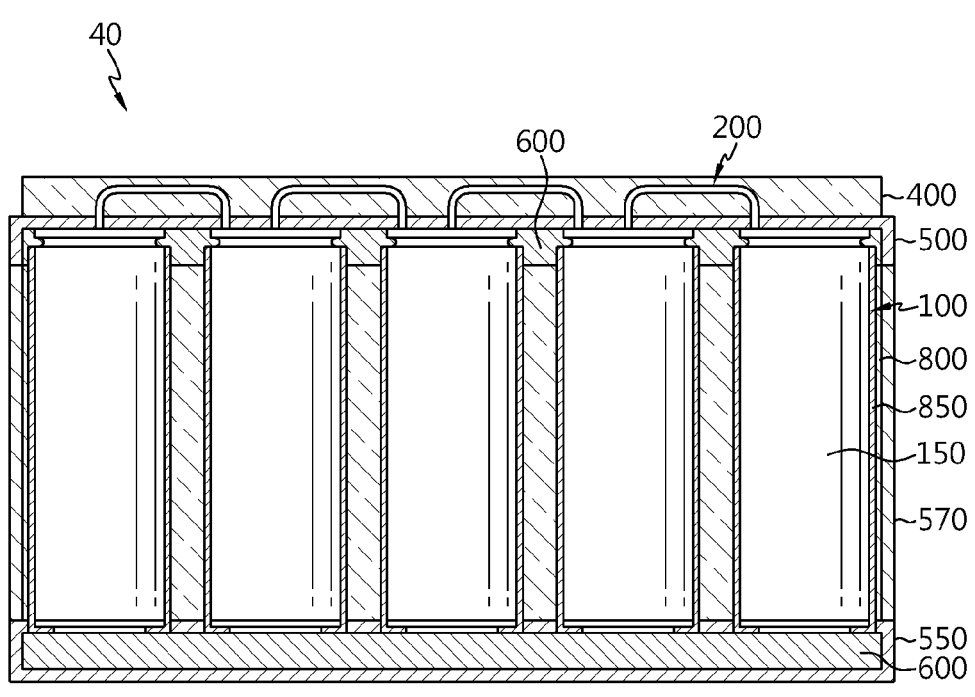
FIG. 5 is a view for describing a battery module according to another embodiment of the present disclosure.

FIG. 5 is a view for describing a battery module according to another embodiment of the present disclosure.

Because a battery module 40 according to the present embodiment is similar to the battery modules 10, 20, 30 according to the above embodiments, a repeated description of elements that are substantially the same as or similar to those in the above embodiments will be omitted and the following will focus on a difference from the above embodiments.

Referring to FIG. 5, the battery module 40 may include the battery cell assembly 100 including the plurality of battery cells 150, the bus bar assembly 200, the potting resin 400, the top frame 500, the bottom frame 550, a side frame 570, the adhesive member 600, a cooling unit 800, and an insulating tube 850.

The battery cell assembly 100 and the bus bar assembly 200 are substantially the same as or similar to those in the above embodiments, and thus a repeated description thereof will be omitted.

The potting resin 400 may be located on an upper side of the top frame 500, and may be filled on an upper side of the battery cell assembly 100 to cover the bus bar assembly 200.

The top frame 500 and the bottom frame 550 are substantially the same as or similar to those in the above embodiments, and thus, a repeated description thereof will be omitted. The side frame 570 may be coupled to the top frame 500 and the bottom frame 550 and may package the battery cells 150 of the battery cell assembly 100 along with the top frame 500 and the bottom frame 550.

The adhesive member 600 is substantially the same as or similar to that in the above embodiments, and thus a repeated description thereof will be omitted.

The cooling unit 800 may be a coolant 800, and may be filled in the top frame 500, the bottom frame 550, and the side frame 570, and between the battery cells 150. The coolant 800 may be cooling water or insulating oil. That is, in the present embodiment, the battery module 40 may be a battery module having a direct water cooling structure through the coolant 800.

The insulating tube 850 for insulating the plurality of battery cells 150 may cover outer circumferential surfaces of the plurality of battery cells 150. Accordingly, a plurality of insulating tubes 850 may be provided to respectively correspond to the plurality of battery cells 150. The plurality of insulating tubes 850 may be provided as shrinkable tubes.

In the present embodiment, a space between the battery cells 150 of the battery cell assembly 100 may be cooled through a direct cooling method through the coolant 800, and in an upper side of the battery module 40 on which the bus bar assembly 200 is located, an area around the bus bar assembly 200 may be cooled while heat dispersion is guided through the potting resin 400.

As such, in the present embodiment, through the potting resin, the battery module 40 having a direct water cooling structure may significantly improve the cooling performance of the battery module 40. In addition, through the potting resin 400, the battery module 40 of the present embodiment may ensure safety such as prevention of chain firing, improve manufacturing efficiency, and reduce manufacturing costs, as in the above embodiments.

Figure 6:
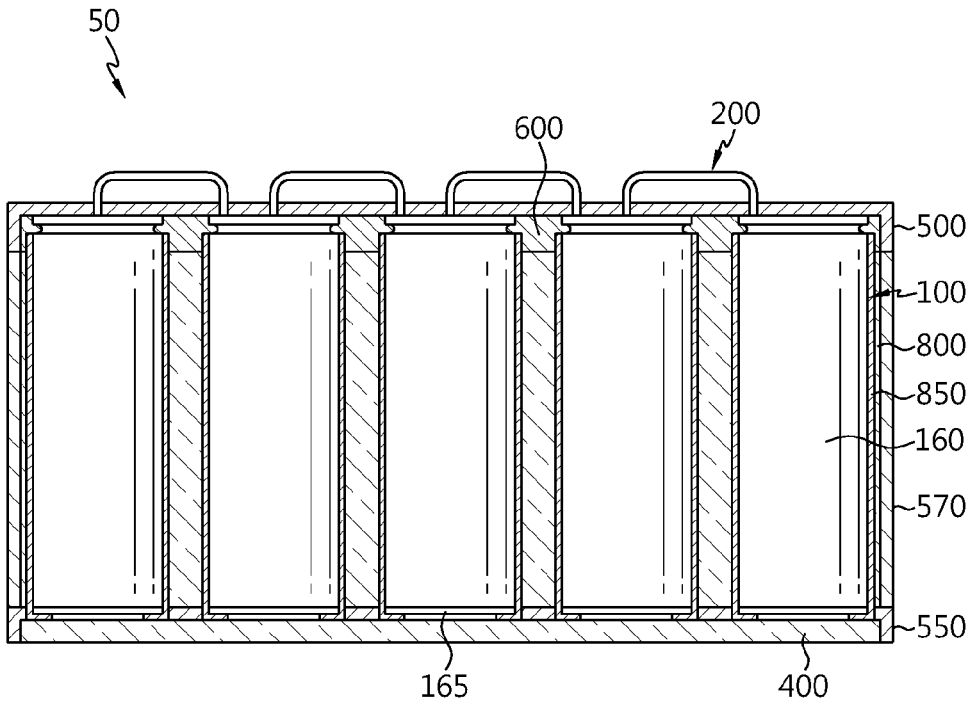
FIGS. 6 and 7 are views for describing a battery module according to another embodiment of the present disclosure.
Figure 7:
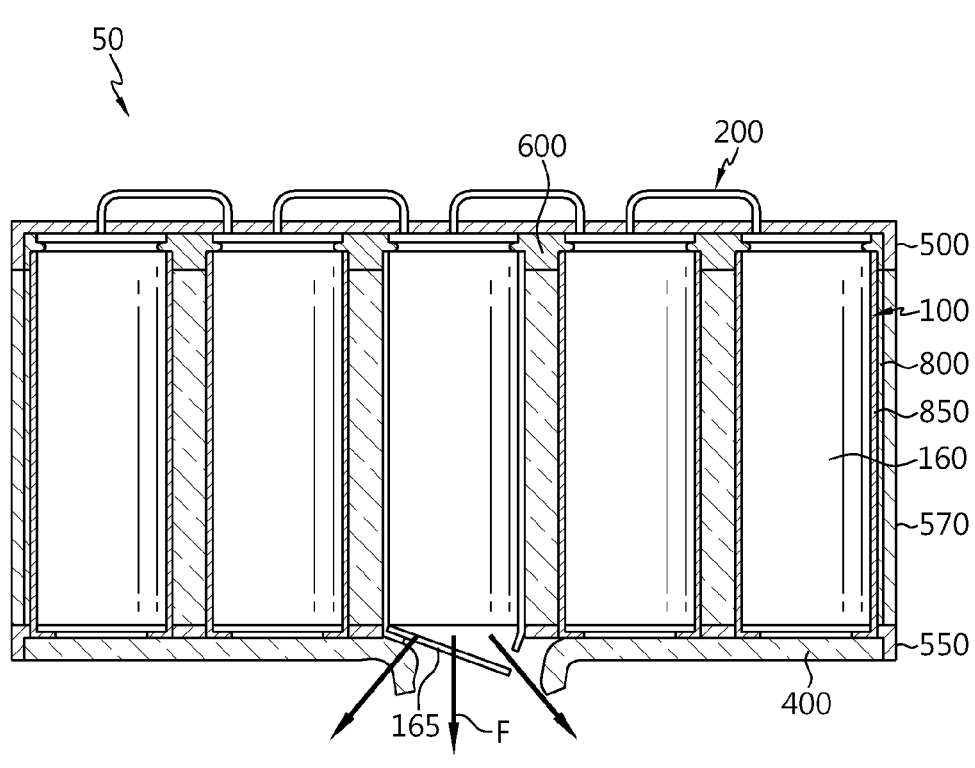

FIGS. 6 and 7 are views for describing a battery module according to another embodiment of the present disclosure.

A battery module 50 according to the present embodiment is similar to the battery modules 10, 20, 30, 40 of the above embodiments, and thus, a repeated description of elements that are substantially the same as or similar to those in the above embodiments will be omitted and the following will focus on a difference from the above embodiments.

Referring to FIGS. 6 and 7, the battery module 50 may include the battery cell assembly 100, the bus bar assembly 200, the potting resin 400, the top frame 500, the bottom frame 550, the side frame 570, the adhesive member 600, the cooling unit 800, and the insulating tube 850.

The battery cell assembly 100 may include a plurality of battery cells 160. The vent unit 165 may be provided under the plurality of battery cells 160.

The bus bar assembly 200 is substantially the same as or similar to that of the above embodiments, and thus, a repeated description thereof will be omitted.

The potting resin 400 may be filled to cover the lower side of the battery cell assembly 100 so as to cover the vent units 165 of the battery cells 160.

The top frame 500, the bottom frame 550, the side frame 570, the adhesive member 600, the cooling unit 800, and the insulating tube 850 are substantially the same as or similar to those in the above embodiments, and thus, a repeated description thereof will be omitted.

In the present embodiment, through the potting resin 400, like the battery module 30, the gas or flame F may be guided to a lower side of the battery module 50 and a remarkable effect such as prevention of chain firing may be provided. That is, even in the battery module 50 having a direct water cooling structure according to the present embodiment, through the potting resin 400, a remarkable effect provided through the potting resin 400 by the battery module 30 of the above embodiment may also be provided.

Figure 8:
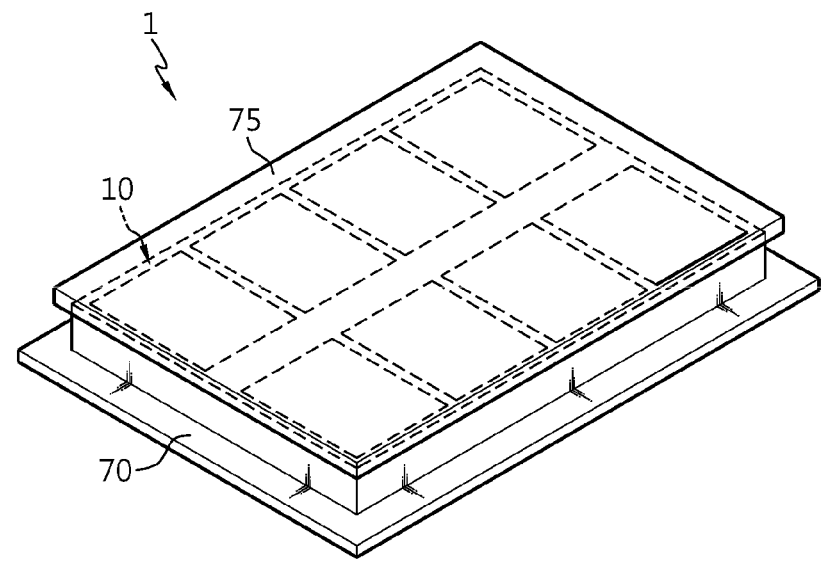
FIG. 8 is a view for describing a battery pack according to an embodiment of the present disclosure.

FIG. 8 is a view for describing a battery pack according to an embodiment of the present disclosure.

Referring to FIG. 8, a battery pack 1 may include at least one battery module 10 of the above embodiment, a pack case 70 for packaging the battery module 10, and a PCM resin 75.

A plurality of battery modules 10 may be provided. The battery module may be any of the battery modules 20 through 50 of the above embodiments, or may be a combination of the battery modules. In addition, the battery module may be any of battery modules other than those of the above embodiments. Also, the battery module may be provided as a combination of a plurality of battery cells without a separate case structure and may be directly mounted on the pack case 70.

The battery pack may include only at least one battery module without the pack case 70. In other words, the battery module may replace a conventional battery pack. That is, battery cells may directly constitute a battery pack without constituting a battery module as in the related art.

The PCM resin 75 may be filled to cover the at least one battery module 10. The PCM resin 75 may be a potting resin such as the potting resin 400 of the above embodiments. In the battery pack 1 according to the present embodiment, because the PCM resin 75 covers the at least one battery module 10, the cooling performance and safety of the battery pack 1 may be further ensured.

Figures 9, 10:
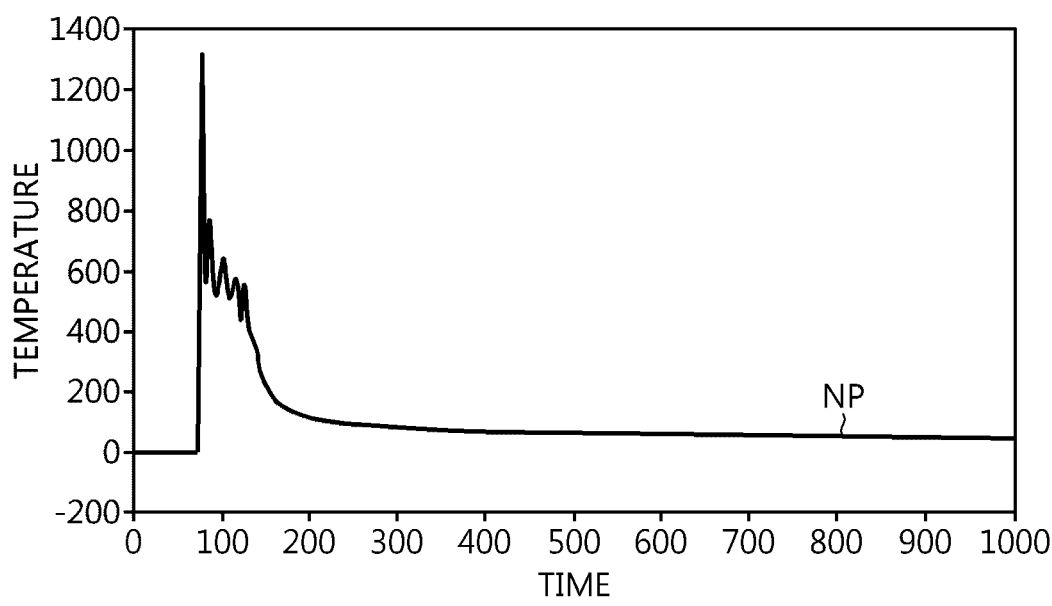
FIG. 9 is a graph showing a result of a discharge test for describing a difference in cooling performance between a battery pack filled with a potting resin according to an embodiment of the present disclosure and a battery pack not filled with a potting resin according to the related art.
FIG. 10 is a graph showing a result of a nail test of a battery pack not filled with a potting resin according to the related art.

FIG. 9 is a graph showing a result of a discharge test for describing a difference in cooling performance between a battery pack filled with a potting resin according to an embodiment of the present disclosure and a battery pack not filled with a potting resin according to the related art.

Referring to FIG. 9, in the graph, a horizontal axis may represent time and a vertical axis may represent temperature. In the graph, a dashed-dotted line may represent a pre-set time and a corresponding temperature axis according to a pre-set safety range.

Specific discharge test conditions for examining a difference in cooling performance are as follows.

First, regarding discharge, a max load may be 84 A (3 C), cut-off current may be 0.582 A (0.02 C), and a cut-off voltage may be 42 V (4.15 V to 3.0 V based on batter cells). In addition, in an external heat insulation condition, an ambient temperature of the battery pack may be set to about 25° C., and a dangerous temperature may be set to about 90° C. through a temperature diagnosis unit. In the battery pack PP filled with a potting resin, the potting resin may be the PCM resin of the above embodiment.

As a result of the test, a difference in cooling performance between the battery pack PP filled with a potting resin and the battery pack NP not filled with a potting resin according to the related art may be in a range of about 13.2° C. In detail, it is found that a highest temperature range of the battery pack PP filled with a potting resin is lower by about 13.2° C. than that of the battery pack NP not filled with a potting resin.

In the battery pack NP not filled with a potting resin, a highest temperature may be above 90° C. that is a dangerous temperature, whereas in the battery pack PP filled with a potting resin of the present disclosure, a highest temperature may be much lower than 90° C. that is a dangerous temperature.

Also, because the battery pack PP filled with a potting resin of the present disclosure has a temperature range of about 66.7° C. even in a pre-set safety range marked by a dashed line (e.g., temperature not exceeding 70° C. during continuous discharge for up to about 758 seconds), the battery pack PP filled with a potting resin may ensure higher safety than the battery pack NP not filled with a potting resin.

Figure 11:
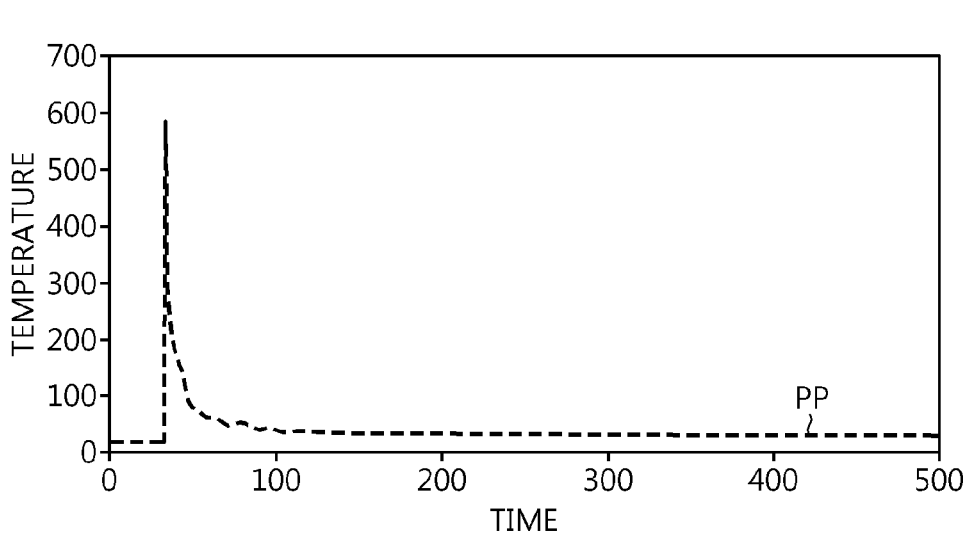
FIG. 11 is a graph showing a result of a nail test of a battery pack filled with a potting resin according to an embodiment of the present disclosure.

FIG. 10 is a graph showing a result of a nail test of a battery pack not filled with a potting resin according to the related art. FIG. 11 is a graph showing a result of a nail test of a battery pack filled with a potting resin according to an embodiment of the present disclosure.

Referring to FIGS. 10 and 11, a nail test that is a nail penetration test may be a test for testing the risk of chain firing of a battery pack. In the graphs, a horizontal axis may represent time and a vertical axis may represent temperature.

In the battery pack NP not filled with a potting resin of the related art, a highest temperature around 100 seconds during a nail test may be above 1300° C. In general, when a highest temperature is over 1000° C., chain firing starts. In contrast, in the battery pack PP filled with a potting resin of the present disclosure, because a highest temperature during a nail test is about 600° C., there is no risk of chain firing.

As described above, the battery pack PP filled with a potting resin may significantly improve cooling performance and may effectively prevent the risk of chain firing which may be caused when a dangerous situation occurs due to penetration, when compared to the battery pack NP not filled with a potting resin.

Figure 12:
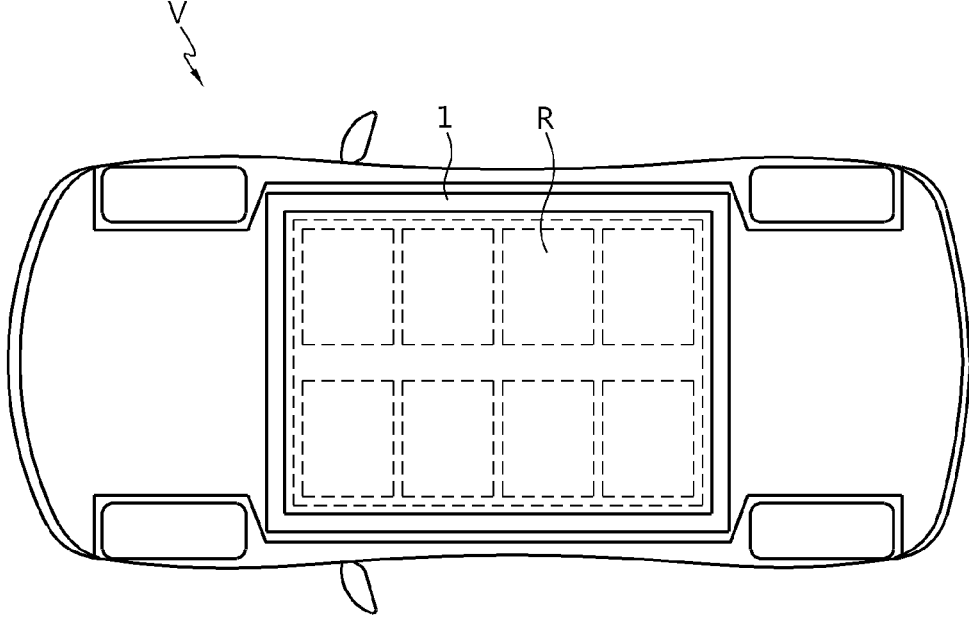
FIG. 12 is a view for describing a vehicle according to an embodiment of the present disclosure.

FIG. 12 is a view for describing a vehicle according to an embodiment of the present disclosure.

Referring to FIG. 12, a vehicle V may be an electric vehicle or a hybrid vehicle, and may include at least one battery pack 1 of the above embodiment and a PCM resin R filled to cover the at least one battery pack 1.

A plurality of battery packs 1 may be provided according to required design capacity, etc. The battery pack 1 may be mounted on a separate pack frame and then may be mounted on the vehicle V, or may be directly mounted on a chassis of the vehicle V.

The PCM resin R may be filled to cover the at least one battery module 10. The PCM resin R may be the potting resin 400 such as the PCM resin 75 of the above embodiment.

In the vehicle V according to the present embodiment, because the PCM resin R covers the at least one battery pack 1, the cooling performance and safety of the vehicle V may be further ensured.

According to above various embodiments, the battery modules 10, 20, 30, 40, 50 in which cooling performance is improved, and the battery pack 1 and the vehicle V including any of the battery modules 10, 20, 30, 40, 50 may be provided.

In addition, according to the above various embodiments, the battery modules 10, 20, 30, 40, 50 in which safety is ensured when an abnormal situation occurs due to overheating or the like of a battery cell, and the battery pack 1 and the vehicle V including any of the battery modules 10, 20, 30, 40, 50 may be provided.

While the preferred embodiments of the present disclosure have been shown and described, the present disclosure is not limited to the specific embodiments described above, various modifications may be made by one of ordinary skill in the art to which the present disclosure pertains without departing from the gist of the present disclosure as defined by the claims, and these modifications should not be individually understood from the technical feature or prospect of the present disclosure.

What is claimed is:

1. A battery module comprising:
a battery cell assembly comprising a plurality of battery cells;
a bus bar assembly on the battery cell assembly and electrically connected to the plurality of battery cells;
a cooling unit spaced apart by a certain distance from the bus bar assembly and configured to cool the battery cell assembly;
a potting resin on at least one of an upper side and a lower side of the battery cell assembly; and
at least one of a lower side and an upper side of the plurality of battery cells including a vent unit, the vent unit being configured to discharge gas therethrough,
wherein the potting resin is filled between the plurality of battery cells and contiguously further contacts and covers of the vent unit,
wherein each of the plurality of battery cells includes the vent unit integrated into an end portion of each of the plurality of battery cells, and wherein a thickness of the vent unit is less than a thickness of a peripheral portion of an end portion of the end portion of each of the plurality of battery cells.

2. The battery module according to claim 1, wherein the bus bar assembly is on the upper side of the battery cell assembly, and wherein the potting resin is further filled to cover the bus bar assembly.

3. The battery module according to claim 1, wherein the cooling unit is on the lower side of the battery cell assembly.

4. The battery module according to claim 1, wherein the cooling unit has a certain length in a stack direction of the battery cell assembly, and is between the upper side and the lower side of the battery cell assembly.

5. The battery module according to claim 1, wherein the vent unit is provided under each of the plurality of battery cells, wherein the potting resin is filled to entirely overlap and cover the vent unit of each of the plurality of battery cells at the lower side of the battery cell assembly.

6. The battery module according to claim 1, wherein the potting resin comprises a thermally conductive material.

7. The battery module according to claim 1, wherein the potting resin comprises a phase-change material.

8. The battery module according to claim 7, wherein the potting resin comprises a paraffin material.

9. The battery module according to claim 1, wherein the potting resin comprises a flame retardant.

10. A battery pack comprising:

at least one of the battery module according to claim 1; and a pack case for packaging the at least one of the battery module.

11. A vehicle comprising at least one of the battery pack according to claim 10.

12. The battery module according to claim 1, further comprising a bottom frame under the plurality of battery cells to support the plurality of battery cells.

13. The battery module according to claim 12, wherein a lower end portion of each of the plurality of battery cells is inserted into the bottom frame.

14. The battery module according to claim 12, wherein the bottom frame is an injection frame or a metal frame.

15. The battery module according to claim 12, wherein the potting resin is disposed between the vent unit and the bottom frame.

16. The battery module according to claim 12, wherein portions of the bottom frame contact bottom surfaces of the plurality of battery cells.

17. The battery module according to claim 1, further comprising a plurality of insulating tubes to cover outer circumferential surfaces of the plurality of battery cells, respectively.

18. The battery module according to claim 1, wherein a top surface of the potting resin between the plurality of battery cells is located lower than top surfaces of the plurality of battery cells.

19. The battery module according to claim 1, further comprising an adhesion member on at least one of the upper side and the lower side of the battery cell assembly.

20. The battery module according to claim 1, further comprising a top frame located on the upper side of the battery cell assembly.

* * * * *